US012657344B1

(12) United States Patent
Swanson

(10) Patent No.: US 12,657,344 B1
(45) Date of Patent: Jun. 16, 2026

(54) TITAN BLUR

(71) Applicant: Brian Richard Swanson, Princeton, IL (US)

(72) Inventor: Brian Richard Swanson, Princeton, IL (US)

(73) Assignee: Vitric Tech LLC, Sheridan, WY (US)

( * ) Notice: Subject to any disclaimer, the term of this patent is extended or adjusted under 35 U.S.C. 154(b) by 0 days.

(21) Appl. No.: 19/397,160

(22) Filed: Nov. 21, 2025

(51) Int. Cl.
G06F 21/62 (2013.01)
H04L 9/08 (2006.01)

(52) U.S. Cl.
CPC ........ G06F 21/6254 (2013.01); H04L 9/0891 (2013.01)

(58) Field of Classification Search
CPC ............................ G06F 21/6254; H04L 9/0891
See application file for complete search history.

(56) References Cited

U.S. PATENT DOCUMENTS

| | | | | |
|---|---|---|---|---|
| 8,516,247 | B2 * | 8/2013 | Canard | H04L 9/0891 |
| | | | | 713/158 |
| 9,223,995 | B1 * | 12/2015 | Lavinio | H04L 63/0421 |
| 9,432,342 | B1 * | 8/2016 | Kothari | H04L 63/0435 |
| 9,806,890 | B2 * | 10/2017 | Ibraimi | H04L 9/3255 |
| 9,898,619 | B1 * | 2/2018 | Hadsall | G06F 21/6245 |
| 10,469,268 | B2 * | 11/2019 | Kawasaki | H04L 63/062 |
| 10,929,556 | B1 * | 2/2021 | Kurian | G06F 3/0623 |
| 11,050,723 | B1 * | 6/2021 | Mahdavi | H04L 63/0478 |
| 11,233,772 | B1 * | 1/2022 | Dinan | G06F 21/6245 |
| 11,251,942 | B2 * | 2/2022 | Li | H04L 9/083 |
| 11,301,586 | B1 * | 4/2022 | Poh | G06F 21/6254 |
| 11,310,041 | B2 * | 4/2022 | Huang | H04L 9/0861 |
| 11,546,141 | B1 * | 1/2023 | Guest | H04L 9/0825 |
| 11,741,216 | B1 * | 8/2023 | Dods | H04L 9/0891 |
| | | | | 713/189 |
| 11,928,187 | B1 * | 3/2024 | Raman | H04N 21/4334 |
| 12,184,797 | B2 * | 12/2024 | Cambou | H04L 9/3268 |
| 12,242,580 | B1 * | 3/2025 | Philbrick | G06F 21/84 |
| 12,256,020 | B1 * | 3/2025 | Lai | H04L 9/50 |
| 12,367,314 | B1 * | 7/2025 | Bogatov | G06F 21/6254 |
| 12,380,240 | B2 * | 8/2025 | Saillet | G06F 21/6254 |
| 12,437,100 | B1 * | 10/2025 | Bogatov | G06F 21/6227 |
| 12,500,873 | B2 * | 12/2025 | Carette | G06F 21/6254 |
| 12,554,885 | B1 * | 2/2026 | Beebe | G06F 21/6254 |
| 2002/0154772 | A1 * | 10/2002 | Morishita | G06F 21/10 |
| | | | | 380/201 |
| 2003/0081787 | A1 * | 5/2003 | Kallahalla | H04L 9/0891 |
| | | | | 380/278 |
| 2003/0115466 | A1 * | 6/2003 | Aull | H04L 9/0897 |
| | | | | 713/172 |

(Continued)

*Primary Examiner* — Aravind K Moorthy

(57) ABSTRACT

A method, system, and non-transitory computer-readable medium for on-device protection of sensitive digital content. Sensitive content is automatically detected prior to or during storage or transmission and irreversibly transformed into unintelligible static noise using a cryptographic key stored exclusively on the originating device. The original content can be selectively restored only by a device possessing the corresponding key. Deliberate deletion of the key permanently prevents restoration, rendering the content as irreversible static noise. The entire process executes exclusively on-device with zero cloud dependency and supports SDK, operating-system-level, and zero-knowledge integration.

20 Claims, 1 Drawing Sheet

SENDER-SIDE
BLUR PROCESS

[USER DEVICE]
↓
ON-DEVICE ML/OCR
DETECTION
(Detects sensitive content in real-time)
↓
GPU GAUSSIAN
BLUR APPLIED
(Irreversible transform to static noise)
↓
CONTENT SPLIT:
3 COMPONENTS
(1) Blurred visual
(2) Encrypted blob
(3) Key → TEE
↓
TRANSMIT:
Blurred visual +
Encrypted blob only
(Key never leaves originating device)

All processing on-device.
Zero cloud dependency.

(56) References Cited

U.S. PATENT DOCUMENTS

| | | | | |
|---|---|---|---|---|
| 2005/0228988 | A1* | 10/2005 | Traw | H04L 9/0891 |
| | | | | 713/158 |
| 2009/0116649 | A1* | 5/2009 | Perlman | H04L 9/088 |
| | | | | 380/277 |
| 2009/0132575 | A1* | 5/2009 | Kroeschel | G06F 21/6254 |
| | | | | 707/E17.037 |
| 2009/0274364 | A1* | 11/2009 | Shakya | G06V 20/40 |
| | | | | 382/165 |
| 2010/0030955 | A1* | 2/2010 | Lai | G06F 13/4234 |
| | | | | 711/E12.007 |
| 2010/0161995 | A1* | 6/2010 | Browning | H04L 9/0891 |
| | | | | 713/189 |
| 2012/0259877 | A1* | 10/2012 | Raghunathan | G06F 21/6254 |
| | | | | 707/757 |
| 2014/0068777 | A1* | 3/2014 | Piratla | G06F 21/60 |
| | | | | 726/26 |
| 2014/0208418 | A1* | 7/2014 | Libin | G06F 21/6209 |
| | | | | 726/19 |
| 2015/0242972 | A1* | 8/2015 | Lemmey | H04L 63/0861 |
| | | | | 705/80 |
| 2017/0039387 | A1* | 2/2017 | Leonardi | H04W 12/02 |
| 2017/0063811 | A1* | 3/2017 | Hitchcock | H04L 9/3234 |
| 2018/0026785 | A1* | 1/2018 | Mori | H04L 9/30 |
| | | | | 713/193 |
| 2018/0083778 | A1* | 3/2018 | McCallum | H04L 9/3066 |
| 2018/0167381 | A1* | 6/2018 | Roth | H04L 9/0891 |
| 2018/0218166 | A1* | 8/2018 | Cachin | H04L 9/0891 |
| 2018/0254892 | A1* | 9/2018 | Egorov | H04L 9/0891 |
| 2019/0026487 | A1* | 1/2019 | Ichida | H04L 63/0407 |
| 2019/0044715 | A1* | 2/2019 | Hunacek | H04L 9/0866 |
| 2019/0095644 | A1* | 3/2019 | Park | G06F 16/288 |
| 2019/0103965 | A1* | 4/2019 | Roake | H04L 9/14 |
| 2019/0132133 | A1* | 5/2019 | Druker | H04L 63/0442 |
| 2019/0266347 | A1* | 8/2019 | Indukuri | G06F 21/6245 |
| 2019/0377901 | A1* | 12/2019 | Balzer | H04L 63/0421 |
| 2020/0026866 | A1* | 1/2020 | Parikh | G06V 40/161 |
| 2020/0143082 | A1* | 5/2020 | Dubishar | G06F 21/6254 |
| 2020/0184098 | A1* | 6/2020 | Andrasick | G06F 21/84 |
| 2020/0213280 | A1* | 7/2020 | Guim Bernat | G06F 21/72 |
| 2020/0218829 | A1* | 7/2020 | Bodziony | G06F 21/6254 |
| 2020/0250334 | A1* | 8/2020 | Bandi | G06F 21/78 |
| 2020/0406664 | A1* | 12/2020 | Munoz Utiel | G07D 11/30 |
| 2021/0021603 | A1* | 1/2021 | Gibbons | G06F 16/221 |
| 2021/0064779 | A1* | 3/2021 | Krishnan | H04L 9/30 |
| 2021/0104332 | A1* | 4/2021 | Kåberg Johard | G16H 50/50 |
| 2021/0209251 | A1* | 7/2021 | Parthasarathy | G06F 21/602 |
| 2021/0256162 | A1* | 8/2021 | Liphardt | G06F 21/6245 |
| 2021/0266170 | A1* | 8/2021 | Rossi | H04L 9/3239 |
| 2021/0334406 | A1* | 10/2021 | Saad | G06F 16/148 |
| 2021/0397747 | A1* | 12/2021 | Moran | G06F 21/72 |
| 2022/0012366 | A1* | 1/2022 | Burceanu | G06F 21/6245 |
| 2022/0029788 | A1* | 1/2022 | Jeljeli | H04L 9/14 |
| 2022/0067203 | A1* | 3/2022 | Pottier | G06N 3/0464 |
| 2022/0188457 | A1* | 6/2022 | Babu | G06F 21/6254 |
| 2022/0335158 | A1* | 10/2022 | Xu | G06F 21/6254 |
| 2022/0417009 | A1* | 12/2022 | Tran | H04H 9/008 |
| 2023/0015412 | A1* | 1/2023 | Mendoza | G06F 21/6245 |
| 2023/0018461 | A1* | 1/2023 | Bourdev | G06N 20/00 |
| 2023/0075402 | A1* | 3/2023 | Liew | H04L 9/30 |
| 2023/0090611 | A1* | 3/2023 | Ciampaglia | G06F 21/6245 |
| | | | | 726/27 |
| 2023/0133702 | A1* | 5/2023 | Shenker | G06V 30/416 |
| | | | | 382/264 |
| 2023/0336339 | A1* | 10/2023 | Karadigudda | H04L 9/0894 |
| 2024/0095385 | A1* | 3/2024 | Dhouib | G06F 21/6254 |
| 2024/0095394 | A1* | 3/2024 | Madhavan | G06F 21/6245 |
| 2024/0129316 | A1* | 4/2024 | Proano | H04L 63/0428 |
| 2024/0243908 | A1* | 7/2024 | Courtois | H04L 9/0891 |
| 2024/0265141 | A1* | 8/2024 | Rattner | G06F 21/6254 |
| 2024/0320364 | A1* | 9/2024 | Mitschker | G06F 21/6245 |
| 2024/0354446 | A1* | 10/2024 | Assouad | G16H 40/67 |
| 2024/0386139 | A1* | 11/2024 | Spreen | G06V 10/82 |
| 2024/0394389 | A1* | 11/2024 | Wen | G06V 20/46 |
| 2024/0403937 | A1* | 12/2024 | Belaoucha | G06F 21/6254 |
| 2025/0021693 | A1* | 1/2025 | Ertas | G16H 10/60 |
| 2025/0038972 | A1* | 1/2025 | Rodriguez Bravo | |
| | | | | H04L 9/3247 |
| 2025/0094611 | A1* | 3/2025 | Bell | G06F 21/6245 |
| 2025/0097018 | A1* | 3/2025 | Mensch | G06F 21/602 |
| 2025/0097569 | A1* | 3/2025 | Bartov | H04N 23/61 |
| 2025/0106057 | A1* | 3/2025 | Leonti | G06Q 10/06 |
| 2025/0131528 | A1* | 4/2025 | Basu | G06T 3/4053 |
| 2025/0165649 | A1* | 5/2025 | Bongiovanni | G06F 21/602 |
| 2025/0285467 | A1* | 9/2025 | Tripathi | G06T 3/18 |
| 2025/0335214 | A1* | 10/2025 | Wen | G06F 21/604 |
| 2025/0363224 | A1* | 11/2025 | Lokesh | G06F 21/60 |
| 2025/0365338 | A1* | 11/2025 | P J | G06N 3/0475 |
| 2025/0390606 | A1* | 12/2025 | Singh | G06F 21/6263 |
| 2026/0011421 | A1* | 1/2026 | Xie | G06F 21/602 |
| 2026/0017410 | A1* | 1/2026 | Lin | G06F 21/6254 |
| 2026/0031977 | A1* | 1/2026 | Dhanawade | H04L 9/0822 |
| 2026/0037668 | A1* | 2/2026 | Lin | G06F 21/6254 |

* cited by examiner

| FIG. 1<br>SENDER-SIDE<br>BLUR PROCESS | FIG. 2<br>RECEIVER UNBLUR &<br>REVOCATION PROCESS | FIG. 3<br>SDK & OS<br>INTEGRATION |
|---|---|---|
| [USER DEVICE] | [RECEIVER DEVICE] | [APPLICATION LAYER] |
| ↓ | ↓ | User App /<br>OS-Level Integration |
| ON-DEVICE ML/OCR<br>DETECTION | REQUEST UNBLUR | ↓ |
| (Detects sensitive<br>content in real-time) | ↓ | TITAN BLUR™ SDK |
| ↓ | BIOMETRIC AUTH<br>→ TEE UNLOCKED<br>→ KEY RELEASED | blurContent(data)<br>revokeKey(id) |
| GPU GAUSSIAN<br>BLUR APPLIED | ↓ | ↓ |
| (Irreversible transform<br>to static noise) | LOCAL ON-DEVICE<br>DECRYPTION | PLATFORM SUPPORT |
| ↓ | (Original content<br>restored locally) | iOS™ | Android™<br>Windows® |
| CONTENT SPLIT:<br>3 COMPONENTS | | ↓ |
| (1) Blurred visual<br>(2) Encrypted blob<br>(3) Key → TEE | [REVOCATION PATH] | CORE PROCESSING |
| ↓ | Sender deletes key<br>from TEE | ML Detection<br>TEE Key Storage<br>GPU Blur Engine |
| TRANSMIT:<br>Blurred visual +<br>Encrypted blob only | ↓ | ↓ |
| | ENCRYPTED<br>REVOCATION SIGNAL<br>(no copy of key) | ZERO-KNOWLEDGE<br>COMPLIANCE |
| (Key never leaves<br>originating device) | ↓ | Receiver verifies blur<br>without accessing<br>original content |
| | ALL CONTENT →<br>PERMANENT<br>STATIC NOISE | |
| All processing on-device.<br>Zero cloud dependency. | Works offline &<br>in airplane mode | No cloud.<br>No third-party<br>key management. |

TITAN BLUR

PRIORITY CLAIM

This application claims priority to U.S. Provisional Patent Application No. 63/917,662, filed Nov. 14, 2025, the entire contents of which are incorporated by reference herein. This application further claims the benefit of the earliest conception and reduction to practice dating back to September 2017 via the public release of the "Self Censor" mobile application (Apple App Store ID 1281434857).

CROSS-REFERENCE TO RELATE APPLICATIONS

This application claims priority to U.S. Provisional Patent Application No. 63/917,662, filed Nov. 14, 2025, the entire contents of which are incorporated by reference herein.

Filing Date: Nov. 21 2025

Application Ser. No. 19/397,160

CROSS-REFERENCE TO RELATED APPLICATIONS

This application claims priority to U.S. Provisional Patent Application No. 63/917,662, filed Nov. 14, 2025, the entire contents of which are incorporated by reference herein. This application further claims the benefit of the earliest conception and reduction to practice dating back to September 2017 via the public release of the "Self Censor" mobile application (Apple App Store ID 1281434857).

FIELD OF THE INVENTION

The present invention relates to data privacy, mobile security, revocable encryption, and on-device machine-learning content detection.

BACKGROUND OF THE INVENTION

In 2017, the "Self Censor" application enabled manual blurring of intimate images before sending. Despite 68% of teens fearing leaks and $10.5T annual cybercrime costs, big tech ignored proactive, sender-side solutions. 2025 regulatory mandates (KOSA, DSA) require sender-side protection. Current art lacks universal, revocable, on-device blurring. The present invention solves this decades-old problem.

SUMMARY OF THE INVENTION

The invention provides:

1. On-device detection of sensitive content via ML/OCR
2. Automatic blurring before transmission using TEE-secured Argon2id keys
3. Biometric unblurring and remote revocation via key deletion
4. Deployment as SDK or OS-level integration across mobile and desktop operating system platforms, including iOS™, Android™, and Windows®
5. Revoked content rendered as static noise
6. Operation in zero-knowledge environment
7. Support for classified/NIST compliance

BRIEF DESCRIPTION OF THE DRAWINGS

FIG. 1 illustrates the sender-side blur process.

FIG. 2 illustrates the receiver unblur and revocation process.

FIG. 3 illustrates the SDK and operating-system integration architecture.

DETAILED DESCRIPTION OF THE INVENTION

The Titan Blur™ system operates entirely on-device with zero cloud dependency. Upon content creation or capture, an on-device machine-learning model (trained on sensitive classes including nudity, identity documents, passwords, and classified markings) scans content in real-time. When sensitive regions are detected, the GPU applies irreversible Gaussian blurring to those regions. The original content is split into three components: (1) the publicly visible blurred visual, (2) an encrypted original blob, and (3) an Argon2id-derived cryptographic key stored exclusively in the device's Trusted Execution Environment (TEE).

Transmission consists only of the blurred visual plus the encrypted original blob. The receiver may request unblurring, which requires a local biometric challenge that unlocks the TEE and temporarily releases the key for on-device decryption. Upon successful authentication, the original content is restored locally and displayed.

Revocation is achieved through simple deletion of the cryptographic key by the sender. Once deleted, any previously transmitted blurred content permanently collapses into irreversible static noise on all receiving devices, even when devices are offline or in airplane mode.

Intimacy Mode provides a user-configurable toggle requiring explicit biometric consent before unblurring. Classified Mode implements NIST-compliant key rotation and FIPS 140-3 validated modules for governmental and defense use.

The SDK exposes two primary calls: blurContent(data) and revokeKey(id). Integration is supported at the application level or directly at the operating-system level for default sender-side privacy across iOS™, Android™, and Windows® platforms.

The entire blurring, encryption, key storage, transmission, unblurring, and revocation process described herein operates exclusively on the user device with no dependency on any remote server, cloud service, or third-party key management system.

The cryptographic key may be derived using post-quantum-resistant algorithms (e.g., Kyber, Dilithium) or upgraded via software update without altering the core blurring and revocation architecture described herein.

The static noise pattern is preferably seeded with true random entropy sourced from the device's hardware random number generator (HRNG) or trusted execution environment, preventing pattern-analysis attacks and forensic reconstruction of the original content.

Revocation operates fully offline: once the sender deletes the key, any previously transmitted blurred content becomes permanently static noise on the receiver's device even when both devices are in airplane mode or permanently disconnected from any network.

In embodiments requiring coordinated revocation across multiple authorized devices, the sender may transmit an encrypted revocation signal containing no copy of the decryption key itself, thereby triggering key deletion on receiving devices while maintaining forward secrecy and zero-knowledge properties.

The system further supports zero-knowledge proof of blur compliance, enabling receivers to cryptographically verify that blurring occurred without gaining access to the original content.

PRIOR ART STATEMENT

Self Censor (2017) established sender-side blur. This invention adds auto-detection revocation, SDK, and OS integration.

CONCLUSION

Titan Blur™ provides the first universal, revocable, on-device privacy layer for 5.3 billion users.

The invention claimed is:

1. A method comprising:

on a user device, automatically detecting sensitive digital content prior to or during storage or transmission;

irreversibly transforming the sensitive digital content into unintelligible static noise using a cryptographic key available only on the user device.

2. The method of claim 1, further comprising remote revocation of access via deletion of the cryptographic key, rendering the sensitive digital content as static noise on a receiver's device.

3. The method of claim 2, wherein revocation occurs even when the user device, a receiver's device, or both are offline or in airplane mode.

4. The method of claim 1, implemented as a software development kit (SDK) for integration with mobile and desktop operating system platform applications, including iOS™, Android™, and Windows® applications.

5. The method of claim 1, wherein detection includes optical character recognition (OCR) for text-based sensitive data.

6. The method of claim 1, further comprising an Intimacy Mode toggle enabling biometric consent for unblurring.

7. The method of claim 1, configured for classified document protection with NIST-compliant key rotation.

8. The method of claim 1, integrated at an operating-system level for default sender-side privacy.

9. The method of claim 1, wherein revoked sensitive digital content is rendered as irreversible unintelligible static noise using GPU-accelerated processing.

10. The method of claim 9, wherein the unintelligible static noise is generated using GPU-accelerated per-image random seed derived from hardware entropy, preventing forensic reconstruction via pattern analysis.

11. The method of claim 1, supporting multi-modal data including images, video, and text.

12. The method of claim 1, wherein the unintelligible static noise and an encrypted version of the sensitive digital content are transmitted together, enabling a receiver to cryptographically verify that blurring occurred without gaining access to the sensitive digital content.

13. The method of claim 1, configured to operate in FIPS 140-3 compliant mode with mandatory access control and audit logging for classified environments.

14. A system comprising:

at least one processor and memory on a user device;

a detection module comprising software instructions executing on the at least one processor configured to identify sensitive digital content on-device prior to storage or transmission;

a blurring module comprising software instructions executing on the at least one processor configured to irreversibly transform the identified sensitive digital content into static noise using a cryptographic key stored in a trusted execution environment (TEE) of the user device; and a revocation module comprising software instructions executing on the at least one processor configured to permanently delete the cryptographic key, thereby rendering the static noise irreversibly unintelligible.

15. The system of claim 14, wherein all operations of claim 11 execute exclusively on-device with no cloud dependency.

16. A non-transitory computer-readable medium having instructions stored thereon that, when executed by at least one processor on a user device, cause the user device to perform operations comprising:

automatically detecting sensitive digital content prior to or during storage or transmission;

irreversibly transforming the sensitive digital content into unintelligible static noise using a cryptographic key available only on the user device.

17. The computer-readable medium of claim 16, wherein the static noise is generated using GPU-accelerated Gaussian blur.

18. The computer-readable medium of claim 16, further comprising instructions for remote key revocation over an encrypted channel.

19. The computer-readable medium of claim 16, further comprising instructions for zero-knowledge proof of blur compliance.

20. A system comprising a processor and non-transitory computer-readable medium storing instructions that, when executed, cause a first device to irreversibly transform sensitive digital content into unintelligible static noise upon a revocation signal received from a second device over an encrypted channel, wherein the revocation signal contains no copy of a decryption key associated with the sensitive digital content.

* * * * *